United States Patent
Gotou et al.

(10) Patent No.: US 11,869,287 B2
(45) Date of Patent: Jan. 9, 2024

(54) ABNORMALITY DETECTION DEVICE FOR EXHAUST GAS SENSOR

(71) Applicant: KAWASAKI MOTORS, LTD., Hyogo (JP)

(72) Inventors: Sayaka Gotou, Kobe (JP); Kenichi Jino, Kobe (JP); Kouta Suzuki, Kobe (JP)

(73) Assignee: KAWASAKI MOTORS, LTD.

( * ) Notice: Subject to any disclaimer, the term of this patent is extended or adjusted under 35 U.S.C. 154(b) by 40 days.

(21) Appl. No.: 17/381,578

(22) Filed: Jul. 21, 2021

(65) Prior Publication Data

US 2022/0044503 A1 Feb. 10, 2022

(30) Foreign Application Priority Data

Aug. 7, 2020 (JP) ................. 2020-134716

(51) Int. Cl.
*G07C 5/10* (2006.01)
*G01M 15/10* (2006.01)
(Continued)

(52) U.S. Cl.
CPC ............. *G07C 5/10* (2013.01); *B62J 45/41* (2020.02); *B62M 7/02* (2013.01); *G01M 15/104* (2013.01);
(Continued)

(58) Field of Classification Search
CPC .. B62J 45/41; B62M 7/02; B62M 7/04; F01N 1/00; F01N 11/00; F01N 2550/00;
(Continued)

(56) References Cited

U.S. PATENT DOCUMENTS 9,026,340 B2 5/2015 Kuratani et al.
2005/0056266 A1 3/2005 Ikemoto et al.
(Continued)

FOREIGN PATENT DOCUMENTS

EP 2530288 * 12/2012
JP H-10169494 * 6/1998
(Continued)

*Primary Examiner* — Phutthiwat Wongwian
*Assistant Examiner* — Diem T Tran
(74) *Attorney, Agent, or Firm* — SNELL & WILMER LLP (57) ABSTRACT

An abnormality detection device determines abnormality in an exhaust gas sensor, disposed in an exhaust passage of an engine to detect a component in exhaust gas. The abnormality detection device includes: a responsiveness determination unit configured to calculate responsiveness of the exhaust gas sensor on the basis of a timewise change of output values of the exhaust gas sensor; and an abnormality determination unit configured to determine that the exhaust gas sensor has abnormality when the responsiveness calculated by the responsiveness determination unit is lower than a predetermined responsiveness threshold. The abnormality determination unit determines if the exhaust gas sensor has abnormality, excluding an excluded period during which a slope of the output values becomes zero or is inversed with respect to a preceding trend of the timewise change while the output values of the exhaust gas sensor timewisely change between a predetermined first and second determination values.

6 Claims, 4 Drawing Sheets (51) Int. Cl.
  *B62M 7/02* (2006.01)
  *B62J 45/41* (2020.01)
  *F01N 1/00* (2006.01)

(52) U.S. Cl.
  CPC ............ *F01N 1/00* (2013.01); *F01N 2550/00* (2013.01); *F01N 2560/00* (2013.01); *F01N 2900/0416* (2013.01)

(58) Field of Classification Search
  CPC ........... F01N 2560/00; F01N 2560/025; F01N 2590/04; F01N 2900/0416; F01N 3/08; G01M 15/104; G07C 5/10; Y02T 10/40
  See application file for complete search history.

(56) References Cited

U.S. PATENT DOCUMENTS

| | | |
|---|---|---|
| 2012/0166068 A1 | 6/2012 | Kuratani et al. |
| 2019/0162103 A1 | 5/2019 | Okamoto |

FOREIGN PATENT DOCUMENTS

| | | |
|---|---|---|
| JP | 2003-013792 A | 1/2003 |
| JP | 2005-121003 A | 5/2005 |
| JP | 2007-170242 A | 7/2007 |
| JP | 2012-136970 | 7/2012 |
| JP | 2019-094851 A | 6/2019 |

\* cited by examiner

ABNORMALITY DETECTION DEVICE FOR EXHAUST GAS SENSOR

CROSS REFERENCE TO THE RELATED APPLICATION

This application is based on and claims Convention priority to Japanese patent application No. 2020-134716, filed Aug. 7, 2020, the entire disclosure of which is herein incorporated by reference as a part of this application.

BACKGROUND OF THE INVENTION

Field of the Invention

The present invention relates to an abnormality detection device configured to detect abnormality in an exhaust gas sensor attached to an exhaust passage of an internal combustion engine.

Description of Related Art

Some models of engines (such as internal combustion engines) have been known in which an exhaust gas sensor is disposed in an exhaust passage to detect a component in exhaust gas (for example, JP Laid-open Patent Publication No. 2012-136970). In JP Laid-open Patent Publication No. 2012-136970, an oxygen sensor is used as the exhaust gas sensor to detect an oxygen concentration in the exhaust gas.

Some of such oxygen sensors have a function for determining sensor abnormality. When exhaust scavenging exhibits an unstable behavior, the oxygen sensor may also have an unstable behavior. When the sensor has an unstable behavior, a longer response time may be detected, which may lead to erroneous determination that the sensor has abnormality, even though the sensor is not deteriorated or abnormal.

SUMMARY OF THE INVENTION

An object of the present invention is to provide an abnormality detection device for an exhaust gas sensor, the abnormality detection device being capable of preventing erroneous determination of sensor abnormality.

In order to achieve the above object, the present invention provides an abnormality detection device for an exhaust gas sensor of an engine, the abnormality detection device being configured to be disposed in an exhaust passage of an internal combustion engine and including:
- a responsiveness determination unit configured to calculate responsiveness of the exhaust gas sensor on the basis of a timewise change of output values of the exhaust gas sensor; and
- an abnormality determination unit configured to determine that the exhaust gas sensor has abnormality when the responsiveness calculated by the responsiveness determination unit is lower than a predetermined responsiveness threshold.

The abnormality determination unit is configured to determine if the exhaust gas sensor has abnormality, excluding an excluded period during which a slope or a rate of change of the output values becomes zero or is inversed with respect to a preceding trend of the timewise change while the output values of the exhaust gas sensor timewisely change between a predetermined first determination value and a second determination value.

According to this constitution, it is possible to exclude determination when the responsiveness is deteriorated due to an unstable behavior of exhaust scavenging, instead of abnormality in the exhaust gas sensor. This makes it possible to prevent erroneous determination of abnormality in the exhaust gas sensor.

The abnormality determination unit may be configured to, for example, detect inversion of the detection signals from a differential value of the timewise change of the detection signals.

The exhaust gas sensor may be, for example, an oxygen sensor configured to detect an oxygen concentration in the exhaust gas. The oxygen sensor may determine the oxygen concentration two-dimensionally between a rich state and a lean state.

In the present invention, the abnormality detection device may further include an abnormality notification unit configured to notify abnormality when the abnormality determination unit has determined that there is abnormality. This constitution allows a driver to easily know the presence of abnormality so as to encourage repair or replacement of the exhaust gas sensor.

In the present invention, the internal combustion engine may be a multicylinder engine including cylinders and exhaust pipes connected to the respective cylinders, the exhaust pipes converging into a single pipe, and the exhaust gas sensor may be attached to the single pipe. According to this constitution, it is only necessary to provide a single exhaust gas sensor, which can suppress an increase in the number of constituting parts and simplify the structure. The convergent pipe facilitates a flow of the exhaust gas by an exhaust pulsation effect. Disposition of the exhaust gas sensor at such a position makes it possible to achieve sensing in a stable gas flow. Where a single exhaust gas sensor is used to detect exhaust gas from a plurality of exhaust pipes, depending on the attachment condition of the exhaust gas sensor, exhaust scavenging tends to exhibit an unstable behavior resulting from a mixing state of the exhaust gas. Use of the abnormality detection device according to the present invention makes it possible to avoid erroneous determination of sensor abnormality and to reduce the number of the exhaust gas sensor.

A motorcycle according to the present invention includes an abnormality detection device for an exhaust gas sensor according to the present invention. Since motorcycles employ engines more adapted for high-speed revolution as compared to those of four-wheeled vehicles, there is a relatively large overlap between opening and closing operations of intake and exhaust valves, and such engines tend to have a small rotational inertia of the crankshaft because responsiveness is of importance. Thus, combustion may hardly be stabilized. Additionally, in motorcycles, it is difficult to perform sensing in a stable gas flow e.g.: because they have a greater space constraint as compared to four-wheeled vehicles; because they have a shorter exhaust passage from the engine to the exhaust gas sensor; and because the exhaust passage is bent. Accordingly, motorcycles tend to have unstable exhaust scavenging due to their characteristics and the constraint on the exhaust system layout, and as a result, erroneous determination is more likely to be made. According to the above constitution, however, it is possible to prevent erroneous determination of abnormality in the exhaust gas sensor.

In the motorcycle according to the present invention, the engine may be disposed between a steering handlebar and a raider seat in a front-to-rear direction or longitudinal direction of a vehicle body of the motorcycle, the exhaust passage may extend forward from a front side of the engine and be bent so as to extend rearward with respect to the engine, and the exhaust gas sensor may be disposed at a forward region with respect to a cylinder axis of the engine in the exhaust passage. Where the exhaust gas sensor is disposed more upstream or at a further upstream position, a catalyst is also disposed more upstream, which is advantageous in that rapid activation can be achieved. In such a case, however, the exhaust passage from the convergent part to the exhaust gas sensor is shortened, and thus, the flow of exhaust gas tends to be unstable in the vicinity of the exhaust gas sensor. According to the above constitution, it is possible to prevent erroneous determination of abnormality in the exhaust gas sensor even if the flow of exhaust gas is unstable, and therefore, it is possible to compatibly achieve activation of the catalyst and prevention of erroneous determination of abnormality in the exhaust gas sensor.

A method for detecting abnormality in an exhaust gas sensor according to the present invention determines abnormality in the exhaust gas sensor disposed in an exhaust passage of an internal combustion engine and configured to detect a component in exhaust gas. The method for detecting abnormality includes: a responsiveness determination step of calculating responsiveness of the exhaust gas sensor on the basis of a timewise change of output values of the exhaust gas sensor; an exclusion determination step of determining an excluded period when a changing trend of the output values of the exhaust gas sensor with respect to a preceding trend of the timewise change satisfies a predetermined condition for the excluded period; and an abnormality determination step of determining if the exhaust gas sensor has abnormality on the basis of the responsiveness calculated in the responsiveness determination step, excluding the excluded period. According to this constitution, it is possible to exclude determination when the responsiveness is deteriorated due to an unstable behavior of exhaust scavenging, instead of abnormality in the exhaust gas sensor. This makes it possible to prevent erroneous determination of abnormality in the exhaust gas sensor.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views:

DESCRIPTION OF THE EMBODIMENTS

Hereinafter, a preferred embodiment of the present invention will be described with reference to the drawings. In the present specification, the term "upstream" and "downstream" means "upstream" and "downstream" with respect to a direction of exhaust gas flow, respectively.

Figure 1:
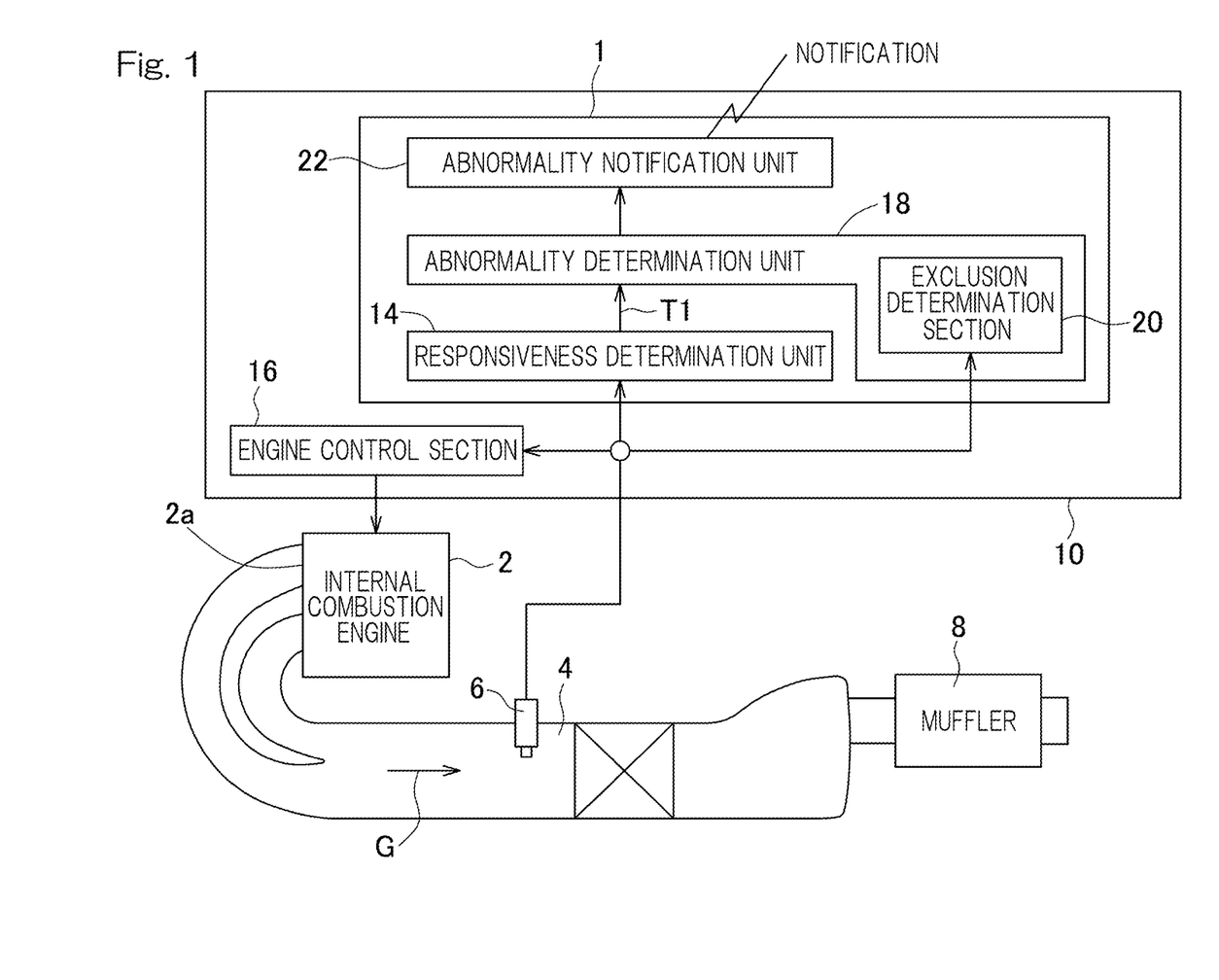
FIG. 1 is a system diagram of an exhaust system including an abnormality detection device for an exhaust gas sensor according to a first embodiment of the present invention.

FIG. 1 is a system diagram of an exhaust system including an abnormality detection device for an exhaust gas sensor according to a first embodiment of the present invention. The exhaust gas sensor 6 may be used in e.g. feedback control of an air-fuel ratio. That is, an output of the exhaust gas sensor 6 is sent to an engine control section 16, and the air-fuel ratio is adjusted in accordance with the output. Abnormality in the sensor is determined on the basis of, for example, a response time (responsiveness) for which a sensor signal passes through a predetermined voltage range. Specifically, it is determined that the sensor has abnormality when a sensor signal has a long response time, i.e., low responsiveness. For example, an abnormality determination value (responsiveness threshold) is set on the basis of a correlation between exhaust gas values and response times, and it is determined that the sensor has abnormality when a response time exceeds the abnormality determination value.

The abnormality detection device 1 for the exhaust gas sensor according to the present invention determines abnormality in the exhaust gas sensor 6 disposed in an exhaust passage 4 of an internal combustion engine 2. The internal combustion engine 2 may be e.g. a reciprocating engine which serves as a driving source of a vehicle. The internal combustion engine 2 includes cylinders arranged either in an inline layout, or a V-type layout, or a horizontally-opposed layout. The internal combustion engine 2 will not be limited in terms of the cylinder arrangement and the number of the cylinders.

The exhaust passage 4 refers to a passage from exhaust ports 2a of the engine 2 to an exhaust outlet at which the exhaust gas is discharged to the atmosphere. The exhaust passage 4 is constituted by exhaust pipes connected to the exhaust ports 2a, a confluent pipe into which the exhaust pipes merge, a catalyst pipe containing a catalyst, an exhaust muffler 8 for muffling the exhaust gas, and a connection pipe connecting the catalyst pipe and the exhaust muffler. In the present embodiment, the exhaust gas sensor 6 is disposed in the confluent pipe.

The exhaust gas sensor 6 detects a component in the exhaust gas G flowing through the exhaust passage 4. The exhaust gas sensor 6 of the present embodiment is an oxygen sensor 6 which detects an oxygen concentration in the exhaust gas G. An output of the oxygen sensor 6 may be used in e.g. feedback control of the air-fuel ratio. That is, an output of the oxygen sensor 6 is sent to the engine control section 16, and the air-fuel ratio is adjusted in accordance with the output. In the present embodiment, a fuel injection amount is regulated to adjust the air-fuel ratio. Alternatively, an air intake amount may be regulated to adjust the air-fuel ratio.

Figure 2:
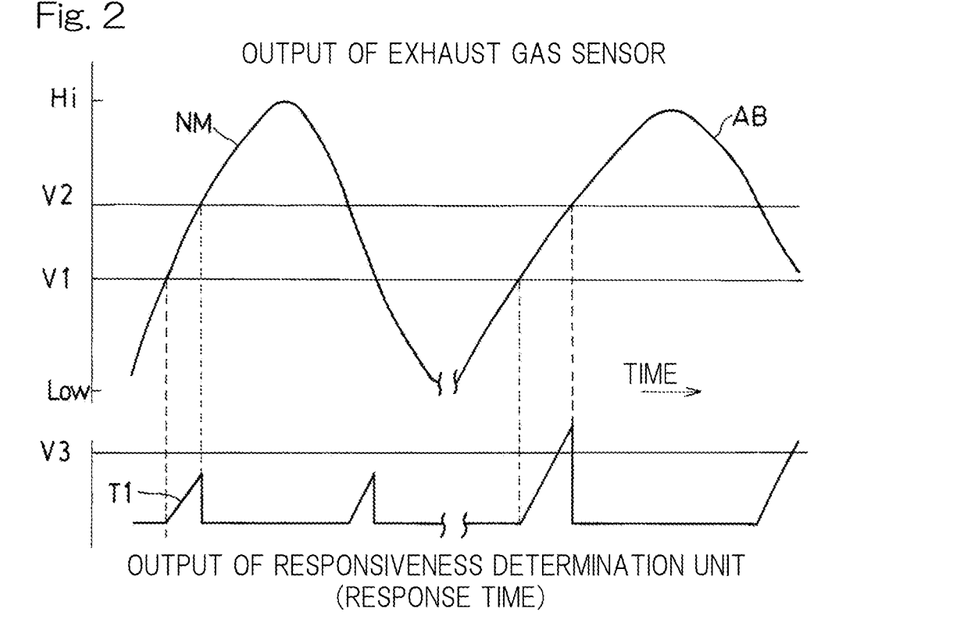
FIG. 2 is a graph showing a timewise change of outputs of the exhaust gas sensor.

FIG. 2 is a graph showing a timewise change of outputs of the exhaust gas sensor 6. The vertical axis of the graph represents the outputs of the exhaust gas sensor 6, and the horizontal axis represents time. FIG. 2 shows the outputs of the exhaust gas sensor 6 in a case where there is no abnormality in an exhaust scavenging behavior. In FIG. 2, the left part (section NM) of the curve represents outputs of the exhaust gas sensor 6 in a normal state, and the right part (section AB) of the curve represents outputs of the exhaust gas sensor 6 in a deteriorated state.

In a feedback area for the air-fuel ratio, the oxygen sensor 6 alternately experiences a rich state (Hi) and a lean state (Low), as shown in FIG. 2. Particularly, the outputs of the oxygen sensor 6 change in a periodic manner (at a frequency of 1 Hz) between areas divided by a stoichiometric mixture ratio. In other words, the oxygen sensor 6 determines the oxygen concentration two-dimensionally between the rich state and the lean state.

The abnormality detection device 1 shown in FIG. 1 includes a program, a storage device for storing the program, and a CPU (central processing unit) for executing the program, and performs self-diagnosis of the oxygen sensor 6. In the present embodiment, the abnormality detection device 1 is provided in an electronic control unit 10. The diagnosis is performed only in the feedback area for the air-fuel ratio, i.e., in a stable driving state without no steep change in engine output.

The abnormality detection device 1 includes a responsiveness determination unit 14 and an abnormality determination unit 18. The responsiveness determination unit 14 calculate responsiveness of the exhaust gas sensor 6 on the basis of a timewise change of output values of the exhaust gas sensor 6. Specifically, the outputs of the oxygen sensor 6 are sent to the responsiveness determination unit 14, and the responsiveness of the exhaust gas sensor 6 is calculated on the basis of the outputs. In a state where the sensor has a stable behavior, the timewise change of the outputs of the exhaust gas sensor 6 in the feedback area for the air-fuel ratio appears in a form close to a sine wave as shown in FIG. 2.

The responsiveness determination unit 14 detects an elapsed time (response time) T1 it takes for the output values of the exhaust gas sensor 6 to change from a predetermined first determination value V1 to a second determination value V2. The response time T1 corresponds to the responsiveness of the exhaust gas sensor 6. As shown in FIG. 2, when the sensor is normal, the responsiveness (response time T1) of the exhaust gas sensor 6 is smaller than the predetermined time (responsiveness threshold V3). The responsiveness (response time T1) of the exhaust gas sensor 6 calculated by the responsiveness determination unit 14 as shown FIG. 1 is outputted to the abnormality determination unit 18.

The abnormality determination unit 18 determines if the exhaust gas sensor 6 has abnormality on the basis of the responsiveness (response time T1) calculated by the responsiveness determination unit 14. Abnormality in the exhaust gas sensor 6 may include aging deterioration and initial failure of the exhaust gas sensor 6. Specifically, the abnormality determination unit 18 determines that the exhaust gas sensor 6 has abnormality when the responsiveness calculated by the responsiveness determination unit 14 is higher than a predetermined responsiveness threshold V3. The responsiveness threshold V3 is set on the basis of a correlation between exhaust gas values and response times (responsiveness) T1.

Where the exhaust gas sensor 6 is normal, the exhaust gas sensor 6 has good responsiveness (short response time T1), and therefore, the responsiveness is lower than the responsiveness threshold V3. Where the exhaust gas sensor 6 is deteriorated and is abnormal, the exhaust gas sensor 6 have poor responsiveness (long response time T1), and therefore, the responsiveness exceeds the responsiveness threshold V3.

In the present embodiment, the abnormality determination unit 18 determines abnormality on the basis of a plurality of calculated values of responsiveness. Particularly, the abnormality determination unit 18 may determine that there is abnormality when one of the plurality of calculated values exceeds the responsiveness threshold V3. Alternatively, the abnormality determination unit 18 may determine that there is abnormality when a predetermined number of values of the plurality of calculated values exceed the responsiveness threshold V3. Further, the abnormality determination unit 18 may determine that there is abnormality when the responsiveness threshold V3 is exceeded multiple times consecutively. Instead, abnormality determination may be made on the basis of an average of a plurality of calculated values, an average of values excluding the maximum and minimum values, a minimum value, or a value of the highest frequency, etc. In such a case, an existing module can be used. The abnormality determination unit 18 may employ any other determination process.

The abnormality determination unit 18 includes an exclusion determination section 20 as shown in FIG. 1. The exclusion determination section 20 determines instability of engine combustion. Where the engine has unstable combustion, the sensor may also have an unstable behavior. The engine is considered as having unstable combustion when, for example, the exhaust gas does not depend on control and changes from a rich state to a lean state despite not being mixed, and/or when the exhaust gas does not follow a control trend even though control is being performed.

Figure 3:
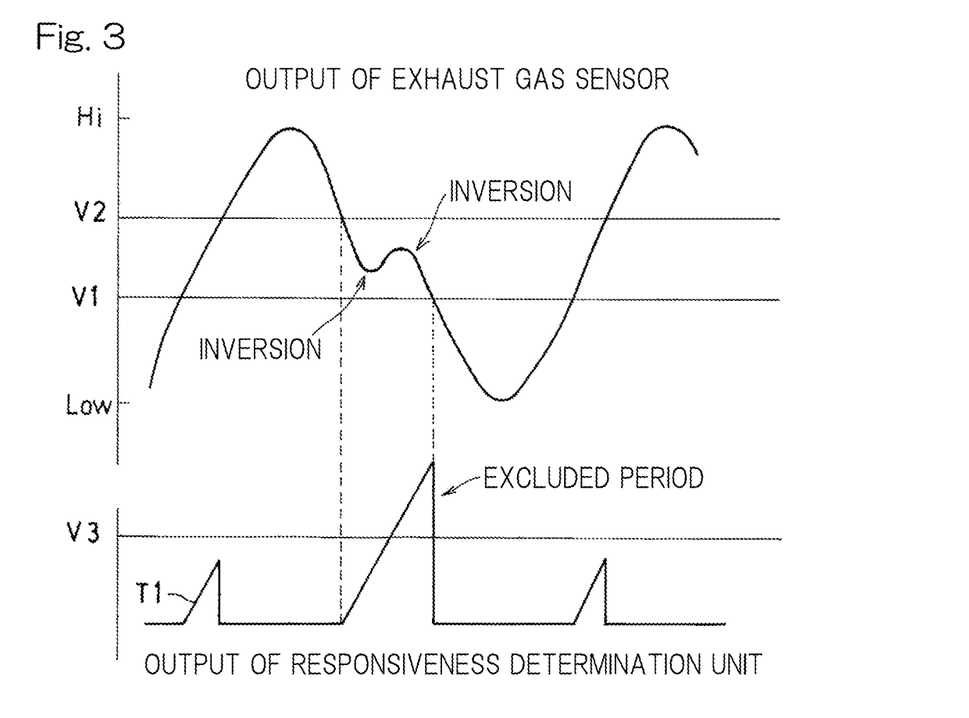
FIG. 3 is a graph showing a timewise change in a case where the exhaust gas sensor has an unstable behavior.

The exclusion determination section 20 determines an excluded period during which a slope of the output values becomes zero or is inversed with respect to a preceding trend of the timewise change while the output values of the exhaust gas sensor 6 timewisely change between the first determination value V1 and the second determination value V2, as shown in FIG. 3. The term "inversed" or the like means that the curve of the output values shows a reversed trend (a shorter trend) with respect to a larger trend (a longer trend); e.g., in a case where the outputs show a decreasing trend, a reversed trend means a temporary increase. The determination of an excluded period by the abnormality determination unit 18, i.e., the determination of whether the detection signals (output values) is zero or is reversed is made on the basis of e.g. a differential value of the timewise change of the detection signal of the exhaust gas sensor 6.

As shown in FIG. 3, where the sensor has an unstable behavior, the response time (responsiveness) T1 may temporarily take a large value exceeding the responsiveness threshold V3, even though the exhaust gas sensor 6 is normal. If such a value is used in determination of sensor abnormality, it may be erroneously determined that the sensor has abnormality. Therefore, the abnormality determination unit 18 determines a period of such a state as an excluded period and excludes the excluded period from determination of sensor abnormality. That is, the abnormality determination unit 18 determines abnormality in the exhaust gas sensor 6, excluding the responsiveness during the excluded period. Thus, erroneous determination can be avoided. As shown in FIG. 1, a result of determination by the abnormality detection device 1 (i.e., the presence/absence of abnormality in the exhaust gas sensor 6) is sent to the engine control section 16.

The abnormality detection device 1 further includes an abnormality notification unit 22 which notifies abnormality when the abnormality determination unit 18 has determined that there is abnormality. Notification of abnormality may be made through e.g. a sound by a buzzer or the like, indication by an abnormality lamp, or failure indication on an instrument panel or the like. Notification of abnormality may be made in any other way. It should be noted that the abnormality notification unit 22 may be omitted.

Figure 4:
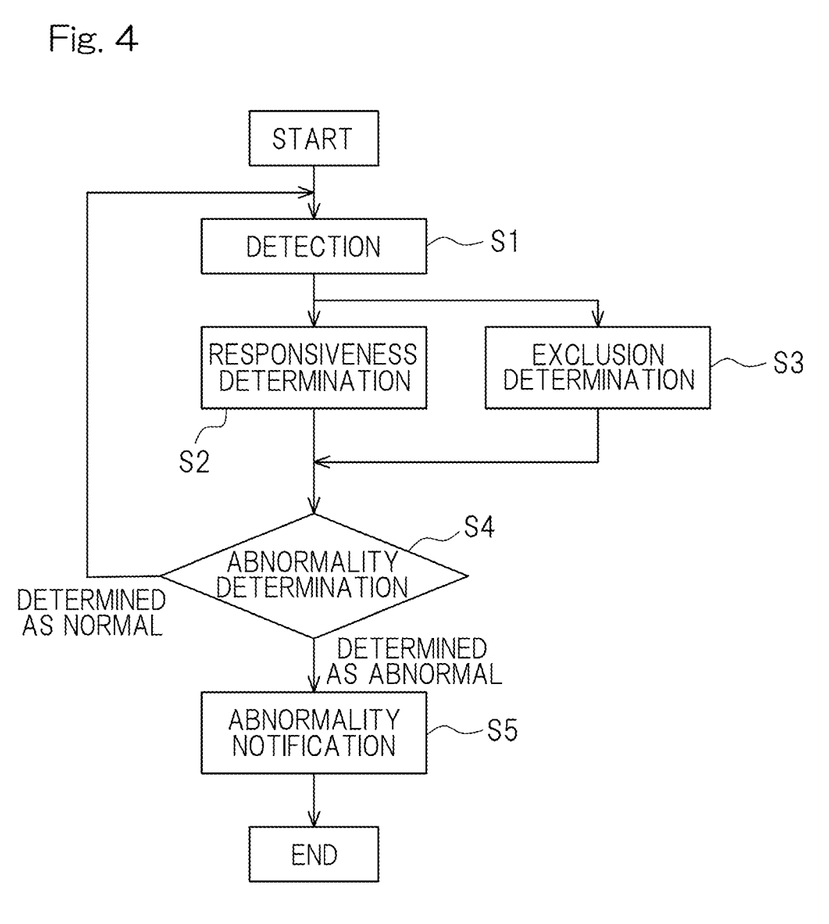
FIG. 4 is a flowchart illustrating a detection procedure of the abnormality detection device.

FIG. 4 shows a flowchart of the abnormality detection device 1 according to the present embodiment. When the engine enters the feedback area for the air-fuel ratio and a stable driving state where, for example, the engine output does not change steeply, the abnormality detection device 1 starts diagnosis. First, the exhaust gas sensor 6 detects a component in the exhaust gas (detection step S1).

The responsiveness determination unit 14 calculates responsiveness (response time T1) of the exhaust gas sensor 6 on the basis of the timewise change of the output values of the exhaust gas sensor 6, which have been detected in the detection step S1 (responsiveness determination step S2). In the responsiveness determination step S2, it is detected how long it takes for the detected values indicating the responsiveness of the exhaust gas sensor 6 to change from one determination value (first determination value) to the other determination value (second determination value) of the two predetermined determination values.

Additionally, the exclusion determination section 20 of the abnormality determination unit 18 determines an excluded period of the exhaust gas sensor 6 on the basis of the timewise change of the output values of the exhaust gas sensor 6, which have been detected in the detection step S1 (exclusion determination step S3). In the exclusion determination step S3, an excluded period is determined when a changing trend of the output values of the exhaust gas sensor 6 with respect to a preceding trend of the timewise change satisfies a predetermined condition for the excluded period. In the present embodiment, an excluded period is determined when a slope of the output values becomes zero or is inversed with respect to a preceding trend of the timewise change in a predetermined measurement range (between the first determination value V1 and the second determination value V2).

Further, on the basis of results of the responsiveness of the exhaust gas sensor 6 calculated in the responsiveness determination step S2 and the excluded period determined in the exclusion determination step S3, the abnormality determination unit 18 determines if the exhaust gas sensor 6 has abnormality (abnormality determination step S4). In the abnormality determination step S4, it is determined if the exhaust gas sensor 6 has abnormality on the basis of the responsiveness (response time T1) calculated in the responsiveness determination step S4, excluding the excluded period determined in the exclusion determination step S3. That is, in the abnormality determination step S4, it is determined if the exhaust gas sensor 6 has abnormality only on the basis of the responsiveness during a time period which is not determined as an excluded period, without using the responsiveness during a time period which is determined as an excluded period.

Where it is determined that the exhaust gas sensor 6 has abnormality in the abnormality determination step S4, for example, when an average of five measurements of the responsiveness (response time T1) exceeds the responsiveness threshold V3, the abnormality notification unit 22 notifies abnormality (abnormality notification step S5). When it is determined that the exhaust gas sensor 6 does not have abnormality in the abnormality determination step S4, the process returns to the detection step S1 and continues the diagnosis.

According to the above constitution, it is possible to exclude determination when the responsiveness is deteriorated due to an unstable behavior of exhaust scavenging, instead of abnormality in the exhaust gas sensor 6 as shown in FIG. 1. This makes it possible to prevent erroneous determination of abnormality in the exhaust gas sensor 6.

Any condition other than the condition that a slope is "reversed" or is "zero" may be used as a trigger. That is, if a timewise change appears in a particular output in a case where a combustion behavior is unstable or the exhaust gas is not sufficiently mixed, this may be added to conditions for the excluded period. In this way, it is possible to avoid determining a state different from sensor abnormality as sensor abnormality by using a timewise change of outputs (graph, form, mapping) as a basis. For example, where an engine is known in advance, it is possible to extract, by a preparatory experiment, characteristics (slope, timewise change, shape) of a trend of a timewise change of outputs which leads to an unstable behavior and to set the characteristics as conditions for the excluded period. In this case, characteristics other than the condition that a slope is "reversed" or is "zero" may be set as conditions for the excluded period. This makes it possible to further enhance accuracy of abnormality determination.

For example, improved accuracy of abnormality determination can reduce occasions when an abnormal state is outputted due to aging deterioration or the like, and optimize a timing of maintenance. In other words, since it is possible to exclude abnormality due to the engine behavior, the sensor can be positioned with greater flexibility. Since the oxygen sensor can be used without being determined as abnormal, the number of $O_2$ feedback occasions can be increased, and therefore, fuel economy can be improved. Where a three-way catalyst is disposed in the exhaust passage, the increased number of $O_2$ feedback occasions can facilitate removal of harmful substances contained in the exhaust gas because the three-way catalyst provides high purification performance at a stoichiometric air-fuel ratio.

The abnormality determination unit 18 determines abnormality on the basis of a plurality of calculated values of the responsiveness (response time T1) during a predetermined time period. Thus, accuracy of abnormality detection can be improved by making the determination based on the plurality of calculated values of the responsiveness.

Further, when the abnormality determination unit 18 has determined that there is abnormality, the abnormality notification unit 22 notifies the abnormality. This constitution allows a driver to easily know the presence of abnormality, so as to encourage repair or replacement of the exhaust gas sensor 6.

Figure 5:
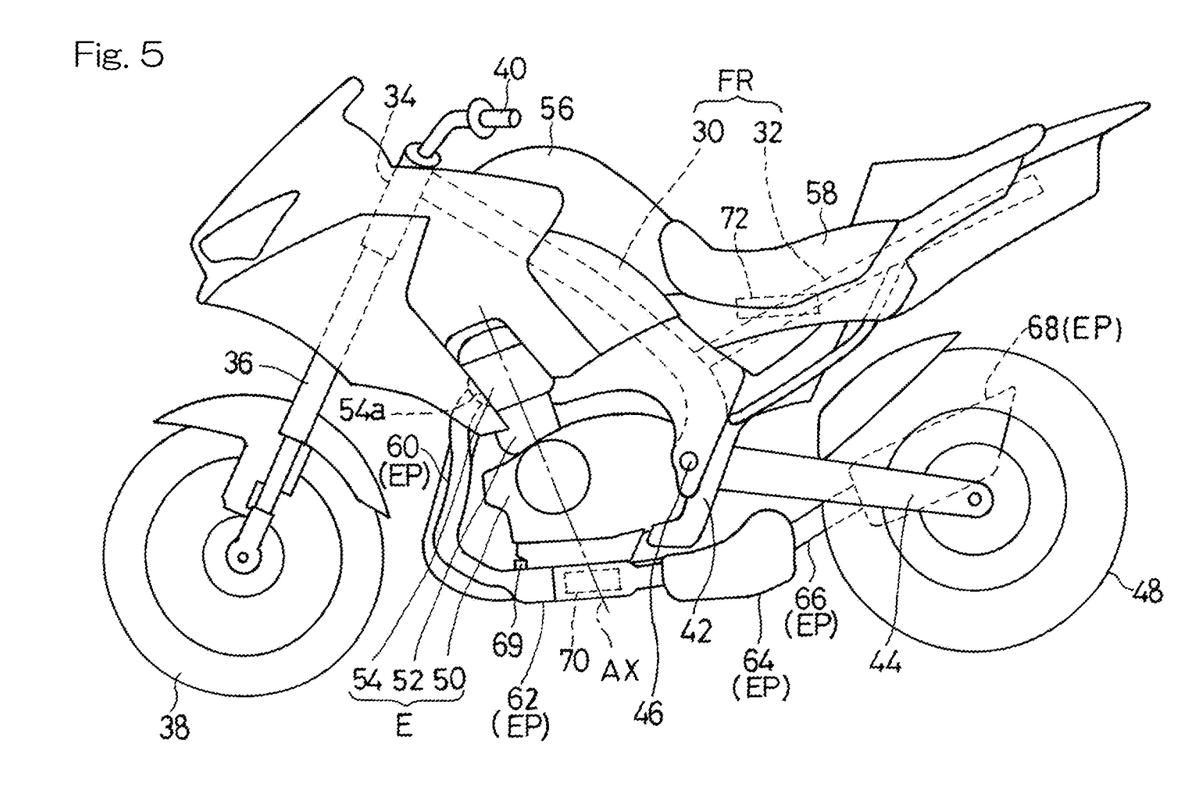
FIG. 5 is a side view of a motorcycle including the abnormality detection device.

FIG. 5 is a side view of a motorcycle including an abnormality detection device 1 according to the embodiment shown in FIG. 1 to FIG. 4. The motorcycle of the present embodiment includes a vehicle body frame FR including a main frame 30 constituting a front half and a rear frame 32 constituting a rear half. The rear frame 32 is connected to a rear part of the main frame 30.

The main frame 30 has a head pipe 34 at a front end of thereof, and the head pipe turnably supports a front fork 36 through a steering shaft (not illustrated). A front wheel 38 is attached to a lower end of the front fork 36. A steering handlebar 40 is attached to an upper end portion of the front fork 36

The main frame 30 has a rear end portion provided with a swing arm bracket 42. The swing arm bracket 42 supports a front end portion of a swing arm 44 such that the swing arm can vertically swing about a pivot axis 46. A rear wheel 48 is attached to a rear end portion of the swing arm 44.

An engine E (internal combustion engine), which serves as a driving source of the motorcycle, is attached below the main frame 30 and in front of the swing arm bracket 42. The engine E drives the rear wheel 48 through a power transmission member (not illustrated) such as a chain.

The engine E of the present embodiment is a parallel four-cylinder engine. The engine E is not limited to a four-cylinder engine and may be a different type of multi-cylinder engines (such as a two-cylinder, three-cylinder, six-cylinder, or V-type 8-cylinder engine) or a single-cylinder engine. The engine E includes a crankcase 50 rotatably supporting a crankshaft (not illustrated), a cylinder 52 protruding upward from the crankcase 50, and a cylinder head 54 attached to an upper part of the cylinder 52. In the present embodiment, the engine has a cylinder axis AX extending upward in a forwardly inclined manner in a side view.

A fuel tank 56 is disposed at an upper part of the main frame 30, and a rider seat 58, on which a rider sits, is fitted to the rear frame 2. The engine E is disposed between the handlebar 40 and the rider seat 58 in a front-to-rear direction or longitudinal direction of a vehicle body of the motorcycle.

The cylinder head 54 has a front surface formed with exhaust ports 54a and a rear surface formed with intake ports (not illustrated). A set of the exhaust port 54a and the intake port is provided for each cylinder, so that there are four exhaust ports and four intake ports in total. An intake system apparatus (not illustrated) is connected to the respective intake ports. The intake system apparatus supplies mixture of outside air and fuel as intake air to the engine E.

An exhaust pipe 60 is connected to each of the exhaust ports 54a. That is, in the present embodiment, there are four exhaust pipes 60. The respective exhaust pipes 60 extend downward in front of the engine E, are then bent rearward, and merge into a convergent part 62 below the engine E. In the convergent part 62, the four exhaust pipes 60 (exhaust passage) converge and form a single pipe (exhaust passage).

An exhaust chamber 64 is connected to a downstream side of the convergent part 62, and an exhaust muffler 68 is connected to a downstream side of the exhaust chamber 64 through a connection pipe 66. The exhaust gas G undergoes repeated expansion and contraction inside the exhaust chamber 64 and the exhaust muffler 68 so as to be muffled and is then discharged to the outside. The exhaust passage EP of the engine E is constituted by the exhaust pipe 60, the convergent part 62, the exhaust chamber 64, the connection pipe 66, and the exhaust muffler 68. The exhaust chamber 64 may be omitted. Thus, in the present embodiment, the exhaust passage EP extends frontward from the front side of the engine E and is bent so as to extend rearward with respect to the engine E.

An oxygen sensor 69 is attached to the convergent part 62. That is, the oxygen sensor 69 is attached to the single pipe (convergent part) 62 into which the exhaust pipes 60 connected to the respective cylinders converge. The oxygen sensor 69 is a type of the exhaust gas sensor for detecting a component in the exhaust gas. The oxygen sensor 69 of the present embodiment is used to adjust a concentration of the fuel. In the present embodiment, the oxygen sensor 69 is disposed in a forward region with respect to the cylinder axis AX in the exhaust passage EP in a side view. A catalyst 70 is contained on a downstream side with respect to the oxygen sensor 69 in the convergent part 62. The exhaust gas G is purified when it passes through the catalyst 70.

An electronic control unit (ECU) 72 including the abnormality detection device 1 according to the present invention is disposed e.g. below the seat 58. However, the position of the electronic control unit 72 is not limited to this position. The oxygen sensor 69 and the electronic control unit 72 are connected by an electric cable (not illustrated).

Motorcycles may hardly have stable combustion due to their characteristics, and therefore, the exhaust gas sensor may also hardly have a stable behavior. Particularly, since motorcycles employ engines adapted for more high-speed revolution as compared to those of four-wheeled vehicles, there is a relatively large overlap between opening and closing operations of intake and exhaust valves, and such engines tend to have a small rotational inertia of the crankshaft because responsiveness is of importance. Thus, combustion may hardly be stabilized. Additionally, although four-wheeled vehicles allow sensing in a stable gas flow because of their long exhaust passage, it is difficult in two-wheeled vehicles to perform sensing in a stable gas flow because of their shorter exhaust passage as compared to that of the four-wheeled vehicles. For these reasons, in motorcycles, the exhaust gas sensor tends to have an unstable behavior. Where the behavior of the exhaust gas sensor becomes unstable as discussed above, measurement may be performed in a state where the sensor is not exhibiting a true responsiveness, and as a result, it may be erroneously determined that there is abnormality.

According to the above constitution, the abnormality detection device 1 of FIG. 1 to FIG. 4 is used to determine abnormality in the oxygen sensor 69 shown in FIG. 5. Therefore, it is possible to exclude determination when the responsiveness is deteriorated due to an unstable behavior of exhaust scavenging. This makes it possible to prevent erroneous determination of abnormality in the oxygen sensor 69.

The oxygen sensor 69 is attached to the single pipe (convergent part) 62 into which the exhaust pipes 60 connected to the respective cylinders of the multicylinder engine E converge. Thus, it is only necessary to provide the single oxygen sensor 69, which can suppress an increase in the number of constituting parts and simplify the structure. The convergent part 62 facilitates a flow of the exhaust gas by an exhaust pulsation effect. Disposition of the oxygen sensor 69 at such a position makes it possible to achieve sensing in a stable gas flow.

Further, the exhaust passage EP extends forward from the front side of the engine E and is then bent so as to extend rearward with respect to the engine E, and the oxygen sensor 69 is disposed at a forward region with respect to the cylinder axis AX of the engine E in the exhaust passage EP. That is, the oxygen sensor 69 is disposed in an upstream region of the exhaust passage EP. Where the oxygen sensor 69 is disposed more upstream, a length of the passage from the convergent part 62 to the oxygen sensor 69 is shortened, so that the flow of exhaust gas tends to be unstable. However, since the abnormality detection device 1 shown in FIG. 1 to FIG. 4 is used to determine abnormality in the oxygen sensor 69, it is possible to prevent erroneous determination of abnormality in the oxygen sensor 69.

In the example of FIG. 5, the oxygen sensor 69 is disposed upstream of the catalyst 70, and the abnormality detection device 1 is used to determine abnormality in the oxygen sensor 69. Where an exhaust gas sensor is disposed downstream of the catalyst 70, the abnormality detection device 1 according to the present invention may also be applied to the exhaust gas sensor on the downstream side. Where exhaust gas sensors are disposed both on upstream and downstream sides with respect to the catalyst 70, the abnormality detection device 1 according to the present invention may be applied to both of the exhaust gas sensors or only one of them. Further, the abnormality detection device 1 according to the present invention may be applied even to an exhaust gas sensor disposed in an exhaust passage without catalyst.

FIG. 5 illustrates an example in which the abnormality detection device 1 according to the present invention is applied to a four-cylinder engine. However, the abnormality detection device of the present invention may also be applied to engines other than four-cylinder engines, such as single-cylinder engines, two-cylinder engines, and three-cylinder engines. In four-cylinder engines, exhaust pulses are canceled out because explosions occur at every 180°, so that a gas flow in the convergent part of the exhaust passage is relatively stable.

For example, in two-cylinder engines, pulsation may easily become unstable although explosions occur at 180° and 540° due to a small number of explosions occurring in one cycle and at irregular intervals. In single-cylinder engines, exhaust pulsation may easily become unstable because the exhaust scavenging is not interfered and because a small number of explosions occur in one cycle. Application of the abnormality detection device 1 according to the present invention to such engines having an unstable gas flow can remarkably facilitate prevention of erroneous determination of abnormality in the exhaust gas sensor.

The abnormality detection device and the method for detecting abnormality according to the present invention may suitably be used in engines in which explosions occur at irregular intervals, valve overlap engines, or engines having large exhaust pulsation. Such engines tend to have an unstable behavior of exhaust scavenging, and therefore, the abnormality detection device and the method for detecting abnormality according to the present invention would provide notable effects. Also, the abnormality detection device and the method for detecting abnormality may suitably be used in a case where an exhaust gas sensor is disposed in the vicinity of a convergent part of exhaust passages of respective cylinders of a multicylinder engine. Even in such a case, the behavior of exhaust scavenging tends to be unstable at a position where the exhaust gas sensor is disposed, and thus, the abnormality detection device and the method for detecting abnormality according to the present invention would provide notable effects.

The present invention is not limited to the above embodiments, and various additions, modifications, or deletions may be made without departing from the scope of the present invention. For example, although the above embodiments are described with reference to an example in which the abnormality detection device and the method for detecting abnormality according to the present invention are applied to an engine of a motorcycle, the abnormality detection device and the method for detecting abnormality according to the present invention may also be applied to engines of vehicles other than motorcycles. Further, the abnormality detection device and the method for detecting abnormality according to the present invention may also be applied to engines other than vehicular engines. Accordingly, such variants are included within the scope of the present invention.

Reference Numerals

1 . . . abnormality detection device
2 . . . internal combustion engine
4 . . . exhaust passage
6, 69 . . . oxygen sensor (exhaust gas sensor)
14 . . . responsiveness determination unit
18 . . . abnormality determination unit
22 . . . abnormality notification unit
40 . . . handlebar
58 . . . seat
60 . . . exhaust pipe
62 . . . convergent part (single pipe)
E . . . engine (internal combustion engine)
G . . . exhaust gas

What is claimed is:

1. A processing unit configured to determine abnormality in an exhaust gas sensor configured to be disposed in an exhaust passage of an internal combustion engine and to detect a component in exhaust gas, the processing unit comprising:
a processor configured to:
calculate responsiveness of the exhaust gas sensor on the basis of a timewise change of output values of the exhaust gas sensor, and
determine that the exhaust gas sensor has abnormality when the responsiveness calculated is lower than a predetermined responsiveness threshold,
wherein the processor is configured to determine if the exhaust gas sensor has abnormality, excluding an excluded period during which a slope of the output values becomes zero or is inversed with respect to a preceding trend of the timewise change while the output values of the exhaust gas sensor timewisely change between a predetermined first determination value and a second determination value, and
wherein the processor is configured to detect the excluded period on the basis of a differential value of the timewise change of the detected values.

2. The processing unit as claimed in claim 1, wherein the exhaust gas sensor is an oxygen sensor configured to detect an oxygen concentration in the exhaust gas.

3. The processing unit as claimed in claim 1, wherein the processor is further configured to notify abnormality when the processor determines that there is abnormality.

4. The processing unit as claimed in claim 1, wherein the internal combustion engine is a multicylinder engine including cylinders and exhaust pipes connected to the respective cylinders, the exhaust pipes converging into a single pipe, and the exhaust gas sensor is attached to the single pipe.

5. A motorcycle comprising the processing unit as claimed in claim 1.

6. The motorcycle as claimed in claim 5, further comprising:
a steering handlebar;
a rider seat; and
an engine, which is the internal combustion engine, disposed between the handlebar and the seat in a longitudinal direction of a vehicle body of the motorcycle,
the exhaust passage extends forward from a front side of the engine and is bent so as to extend rearward with respect to the engine, and
the exhaust gas sensor is disposed at a forward region with respect to a cylinder axis of the engine in the exhaust passage.

* * * * *